C. B. MANVILLE.
STEAM BOILER AND PIPE COVERING.
No. 334,959. Patented Jan. 26, 1886.
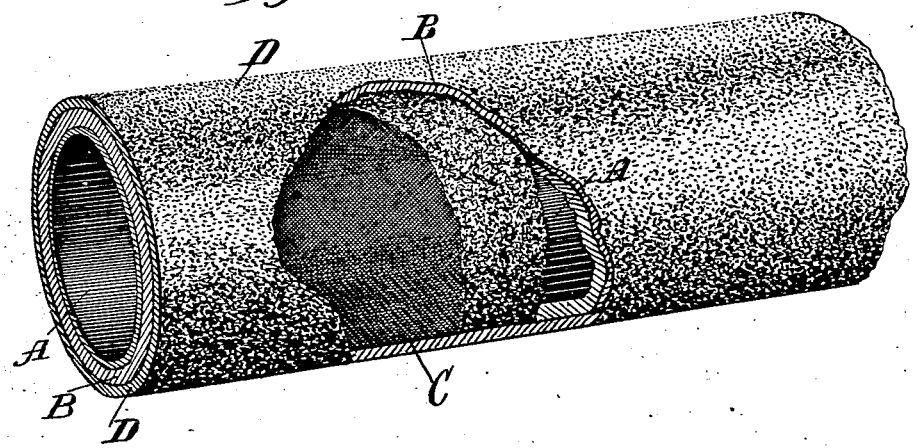
Fig. 1.
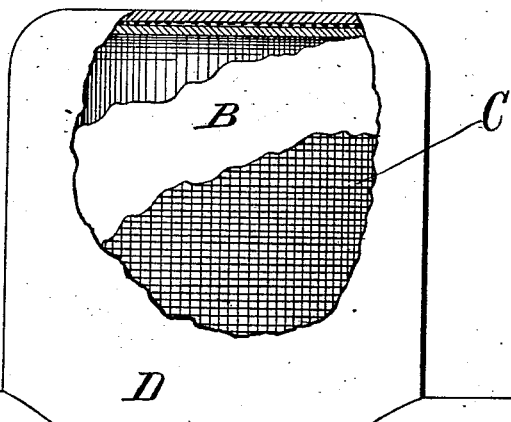
Fig. 2.
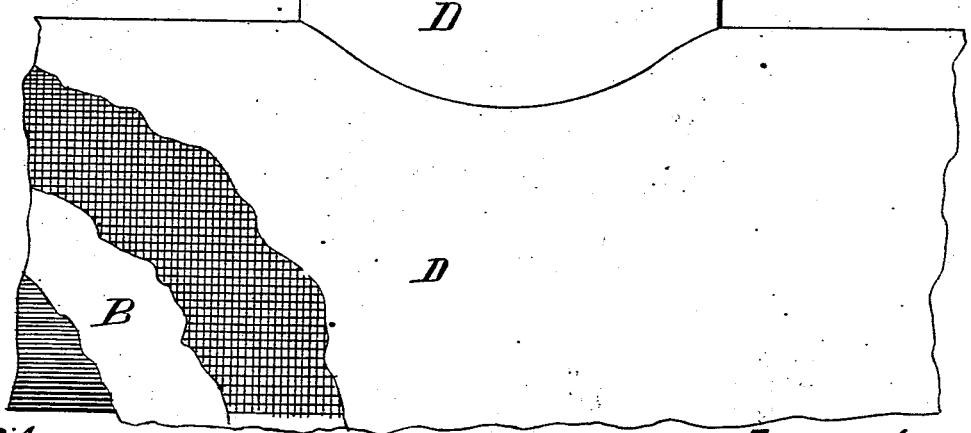
Witnesses:
Inventor:
Chas. B. Manville
By Stone & Underwood
Attorneys

UNITED STATES PATENT OFFICE.

CHARLES B. MANVILLE, OF MILWAUKEE, WISCONSIN.

STEAM BOILER AND PIPE COVERING.

SPECIFICATION forming part of Letters Patent No. 334,959, dated January 26, 1886.

Application filed May 26, 1885. Serial No. 166,728. (No model.)

*To all whom it may concern:*

Be it known that I, CHARLES B. MANVILLE, of Milwaukee, in the county of Milwaukee, and in the State of Wisconsin, have invented certain new and useful Improvements in Steam Boiler and Pipe Coverings; and I do hereby declare that the following is a full, clear, and exact description thereof.

My invention relates to coverings for steam pipes, boilers, &c., and will be fully described hereinafter.

In the drawings, Figure 1 is a side view of a steam-pipe with my covering in place thereon partly broken away to display the layers. Fig. 2 is a like view of a steam-boiler.

A is the pipe, and B is a coating which is composed of a mixture consisting of about three parts of sheep's wool or wool-dustings, and one part clay, to which is added about two pounds of pulverized glue for each barrel, and then the ingredients are mixed together with sufficient water to make a plastic and adhesive compound. This coating B is then wrapped with burlap or other fabric, C, either wound directly or spirally about it, and then the coating D is applied. This consists of a mixture of sheep's wool or wool-dusting, clay, and soluble glass in the proportions of about one half in bulk of wool or dustings, the other half of clay, the two being mixed with water and about one gallon of soluble glass to each barrel, this to be rubbed upon the burlap preferably with a rubber pad.

I am aware that the materials set forth in this application have been used in boiler-coverings, and therefore I do not claim their use, broadly, for such purposes.

Having thus described my invention, what I claim as new, and desire to secure by Letters Patent, is—

A boiler-covering consisting of three layers, the first or inner coating consisting of clay mixed with wool or wool-dustings and glue, the next of a wrapping of fabric, and the third or outer coating of wool or wool-dustings mixed with soluble glass, as set forth, and in the proportions herein described.

In testimony that I claim the foregoing I have hereunto set my hand, at Milwaukee, in the county of Milwaukee and State of Wisconsin, in the presence of two witnesses.

CHARLES B. MANVILLE.

Witnesses:
S. S. STOUT,
H. J. FORSYTH.